United States Patent
Sceats et al.

(10) Patent No.: US 12,315,907 B2
(45) Date of Patent: May 27, 2025

(54) RECHARGEABLE BATTERY AND CATALYST MATERIALS AND THE MEANS OF PRODUCTION THEREOF

(71) Applicant: CALIX LTD, New South Wales (AU)

(72) Inventors: Mark Sceats, New South Wales (AU); Philip Hodgson, New South Wales (AU); Khokan Kanti Majumder, Vic (AU)

(73) Assignee: CALIX LTD, New South Wales (AU)

(*) Notice: Subject to any disclaimer, the term of this patent is extended or adjusted under 35 U.S.C. 154(b) by 66 days.

(21) Appl. No.: 18/200,057

(22) Filed: May 22, 2023

(65) Prior Publication Data
US 2023/0299257 A1    Sep. 21, 2023

Related U.S. Application Data

(62) Division of application No. 16/476,662, filed as application No. PCT/AU2018/050017 on Jan. 12, 2018, now Pat. No. 11,695,103.

(30) Foreign Application Priority Data

Jan. 12, 2017 (AU) ................ 2017900085

(51) Int. Cl.
*H01M 4/04* (2006.01)
*H01M 4/133* (2010.01)
*H01M 4/1393* (2010.01)
*H01M 4/505* (2010.01)
*H01M 4/525* (2010.01)

(52) U.S. Cl.
CPC ....... *H01M 4/0416* (2013.01); *H01M 4/0447* (2013.01); *H01M 4/0459* (2013.01); *H01M 4/133* (2013.01); *H01M 4/1393* (2013.01); *H01M 4/505* (2013.01); *H01M 4/525* (2013.01)

(58) Field of Classification Search
CPC ............. H01M 4/0416; H01M 4/0447; H01M 4/0459; H01M 4/133; H01M 4/1393; H01M 4/505; H01M 4/525
See application file for complete search history.

(56) References Cited

U.S. PATENT DOCUMENTS 4,198,273 A    4/1980 Dudek et al.
6,136,476 A    10/2000 Schutts et al.
(Continued)

FOREIGN PATENT DOCUMENTS

CN    104393318 A * 3/2015
WO    2007112496 A1   10/2007
(Continued)

*Primary Examiner* — Brian R Ohara
*Assistant Examiner* — Emily Elizabeth Freeman
(74) *Attorney, Agent, or Firm* — Elmore Patent Law Group, P.C.; Joseph C. Zucchero; Carolyn S. Elmore

(57) ABSTRACT

A process for producing a cathode or anode material adapted for use in the manufacture of fast rechargeable ion batteries. The process may include the steps of selecting a precursor material; grinding the precursor material to produce a powder; calcining the precursor powder, processing the hot precursor powder in a second calciner reactor segment; quenching the second precursor powder; and activating the particles of the second precursor powder.

12 Claims, 2 Drawing Sheets

(56) References Cited

U.S. PATENT DOCUMENTS

| | | | |
|---|---|---|---|
| 2008/0112880 A1* | 5/2008 | Kayama | B01J 35/39 |
| | | | 423/613 |
| 2010/0069507 A1 | 3/2010 | Tabata et al. | |
| 2015/0194670 A1 | 7/2015 | Kim | |
| 2016/0118656 A1* | 4/2016 | Nakayama | H01B 1/08 |
| | | | 252/182.1 |
| 2016/0141614 A1 | 5/2016 | Suh et al. | |
| 2017/0253494 A1 | 9/2017 | Garella et al. | |
| 2018/0019493 A1* | 1/2018 | Jakus | B33Y 10/00 |

FOREIGN PATENT DOCUMENTS

| | | |
|---|---|---|
| WO | 2016077863 A1 | 5/2016 |
| WO | 2016083185 A1 | 6/2016 |

\* cited by examiner

RECHARGEABLE BATTERY AND CATALYST MATERIALS AND THE MEANS OF PRODUCTION THEREOF

RELATED APPLICATIONS

This application is a divisional of U.S. application Ser. No. 16/476,662, filed Jul. 9, 2019, which is a US National stage entry of International Application No. PCT/AU2018/050017, which designated the United States and was filed on Jan. 12, 2018, published in English and which claims priority to AU Application No. 2017900085, filed Jan. 12, 2017. The entire teachings of the above applications are incorporated herein by reference.

TECHNICAL FIELD

The present invention generally relates to the production of materials and components for rechargeable batteries and catalysts. This invention is a further application of a calcination technology described by Sceats and Horley (Australian Patent No. 2007233570) and Sceats et. al. (Australian Patent No. 2016904444), included herein in their entireties, which described a general method of manufacture of materials, and which is further developed and applied herein to the production of powder materials for battery sub-systems, such as anodes, cathodes, ion conductors, separators, and materials for catalyst subsystems such as catalyst blocks; and which also includes the processes that enable the production of sheets of the subsystems to make integrated devices.

BACKGROUND

Rechargeable (secondary) batteries, for applications such as in electric vehicles, have been developed using a variety of materials as electrodes, based on the conducting ion such as lithium, for lithium-ion batteries, on the magnesium ion for magnesium-ion batteries and on the sodium ion for sodium-ion batteries. Lithium-ion batteries used for electric vehicles are typically composed of two types of cells, namely energy cells that are constructed for high energy storage characterised by slow charge and discharge rates, and power cells constructed for high peak power actions such as accelerating, braking and recharging. The response of the cells to the drive chain is generally managed by a battery management system, which controls the energy flows between these cells for the optimum overall performance.

Some common methods for production of materials for use with battery components may be heat processing, however these processes can be difficult to control during short periods of time, and may yield brittle materials if rapid heating is conducted. As such, a number of nano-active materials may not be obtained or are lost from the material.

The general methodology for such battery construction is exemplified by the lithium-ion batteries. These batteries are composed of a metal anode which is in electrical contact with an anode material, generally carbon-based particles in an electrolyte paste containing the lithium conduction ion, and a metal cathode which is in electrical contact with a cathode material, which is generally formed of crystalline metal oxide particles in the electrolyte paste, with the anode paste and the cathode paste being separated by a fabric material that is impervious to the anode and cathode particles but is permeable to the electrolyte ions. The chemical composition of these powder materials are selected by their ability to react with the lithium ion, and this is achieved by selecting materials into which the lithium ions can be stored within the powder material by a process called intercalation, whereby the lithium ions can reversibly move into and out of these particles, and the particles respond to the intercalation by changing their oxidation state through reactions which take electrons from, or give electrons to, the metallic coatings to complete the electrical circuit.

Of significant importance is the charge capacity of both anode and cathode materials which is measured in amp-hours/kg of material.

Previously, there have been many cathode materials researched and developed. These are generally metal oxides, including phosphates, such as Lithium Iron Phosphate, Nickel Manganese Cobalt Oxide, Nickel-Cobalt-Aluminium Oxide, and Lithium Manganese Spinel. For example, a range of cathode materials are based on manganese oxides, which can exist in many valence states as $MnO_2$, $Mn_2O_3$, $Mn_3O_4$, $Mn_5O_8$ and $MnO$, each with a wide variety of crystal structures, and some of which are characterised by channels through which a lithium ion can be readily intercalated for storage. The materials may have a range of capacities that depend on the method of manufacture to get the required degree of intercalation. There are a number of anode materials that have been developed, such a graphite, silica doped graphite, doped graphene, lithium titanium oxide, and are under development such as silicon.

For electric vehicles, the battery weight is critical, so the charge capacity of the rechargeable anode and cathode materials are both desirably high. In addition, the desirable materials should be low cost, safe and, most importantly, must be stable over many charge and discharge cycles.

The characteristic, galvanic response for an energy storage battery cell is that the response of the cell to a charging or discharging current is one in which the cell voltage changes minimally. Thus the cell voltage is reasonably well defined, and is an important characteristic of the battery material. The electrode powder materials used in energy storage battery cells are generally characterised by large crystallites of pure materials. The response of such cells is generally slow, primarily because of the slow diffusion of the conducting (lithium) ion through the crystallites for charging and discharging.

However, the high surface area leads to materials that have a very large capacitance from the electrical double layers of the electrolyte that form in the pores around the nano-crystallites, so that the galvanic response of the cell upon charge and discharge is a large voltage change with the degree of charging, in contrast to the nearly constant voltage of an ideal energy storage battery described above. This capacitance contribution increases with the surface area, and can dominate the response, so that the cells for power are often called super-capacitors or ultra-capacitors. The charge density of these materials can exceed that of the bulk material because the double layer capacitance within the particle stores energy in addition to that from charge intercalation.

The challenge that this invention addresses is the dimensional stability of such high surface area, porous materials. A preferred feature of such cells is the existence of very high electrostatic forces from the double layers and from the intercalation-induced volumetric changes within the particle. These forces may not only fracture the particles in the case of strongly bound porous materials, but more generally cause irreversible rearrangements of the nano-crystallites within the particle especially if the "particle" is just a weakly bound aggregate of nano-scale crystallites. Such irreversible changes cause the battery performance to degrade over time because the packing of the nano-crystallites, and thus the supercapacitance and the response time change. There is a need for the development of production processes to manufacture high surface area porous materials that are dimensionally stable during multiple charge/discharge cycles. This present invention may relate to the method of manufacture of such electrode materials, particularly for use in power battery cells for electric vehicles.

A typical route to manufacture of such materials is to produce the materials without lithium ions, and then to insert the lithium during the first charging cycle in the cell from the electrolyte. For example, the lithium manganese spinel may be formed for power cells by producing high surface manganese oxide, and then using the initial charging cycles to intercalate the lithium ion into the material, with a portion of these ions progressively remaining permanently in the materials during the initial discharge cycles. This method of post-production cannot generally be used for energy storage batteries because the large crystallite sizes are such that the materials may fragment from the large volumetric changes from such intercalation and the charging time is excessive, so the powder material is initially fabricated with lithium ions in the lattice, such that the intercalation of additional ions for the reversible charging can be accommodated. An example is the lithium manganese battery, in which the energy storage cathode material is, for example, is a powder of manganese lithium spinel, and the equivalent power cell is formed from a powder of high surface area manganese oxide which is intercalated with a lithium in the battery, during the initial charging cycles. Generally, the principle is established that the production processes of powders for energy storage and power cells may be different.

Another issue for lithium ion batteries is the propensity of the battery to short circuit through the growth of dendrites, or "whiskers", of the metal electrode which pierce the separator. Whiskers are structural changes of the deposited lithium metal at the surface during many charge/discharge cycles. The short circuit may lead to combustion of the battery electrolyte, which is of great concern for safety. Generally, minimisation of the propensity to grow whiskers involves minimising the surface roughness of the lithium. In addition, the use of porous ion conductors with a high lithium ion conductivity and a low electron conductivity and a strength to suppress whisker growth have been developed.

A further issue for lithium ion batteries is the limitation of the temperature of operation. Apart from the electrolyte materials properties, a significant factor is the performance of the fabric separator. The separator, usually a porous membrane, ensures that the electrode material particles cannot migrate through from one half-cell to the other, leading to a short circuit. Preferably the separator also has the strength to withstand puncture by whiskers. Porous ceramic separator materials have been developed to provide higher strength materials and enable higher temperature operation and safe operation. This issue is a major concern for high power batteries, where intrinsic electrical resistivity of the battery leads to large temperature rises and membrane failure. It is desirable that the separator materials are strong, temperature stable, materials with high ion conductivity.

A figure of merit for post-processing intercalation is the number of cycles it takes to achieve an invariant charge-discharge cycle. Thus, the method of manufacture described herein refers to the manufacture of materials for anodes and cathodes that can be later intercalated with the conducting ion in the first few charging cycles.

While there exist a wide range of proven supercapacitor materials, they generally do not have sufficient charge capacity for use in battery cells, and cells made from these materials are not desirable because they require too much material to meet the weight restrictions, given the limitation of the cell voltage in battery applications. To achieve that requirement, the materials must also allow for intercalation of the conducting ion into the material to increase the stored charge density. Thus, the best properties for battery materials for power cells are usually derived from materials that are based on the same basic chemical compounds that have been proven in energy storage battery cells, where the intercalation of conducting ions has been demonstrated.

Turning to the means of production of high surface area porous materials for batteries, a common approach in research has been to use nano-materials synthesis, such as sol-gel or electrodeposition. Nano-materials have very high surface areas, typically greater than 50 m2/g, preferably greater than 150 m2/gm and more preferably greater than 250 m2/g, and nano-materials synthesis means forming nano-particles from a precursor, and then arranging them in network to form a porous, high surface area material. There are many means of producing such nano-materials. This invention is not a synthesis process.

Say that the desired volume of the electrode material and the electrolyte within the "particle" is about 50%:50% before intercalation. Then, in one limit the electrode material can be made as an aggregate of weakly bonded nano-crystallite particles mixed with electrolyte, and in another limit the material can be made as a single porous particle into which the electrolyte is later diffused. The difference between these materials, in the battery, is the binding between the nano-crystallites. The first is an aggregate and the second is a composite.

The first attempts to make these materials for batteries used conventional nano-particle synthesis routes such as sol-gel and electrochemical techniques. These methods produced individual particles typically with spheroidal shapes with diameters of the order of nanometers to provide the required surface area. However, when mixed with electrolyte paste and used in a battery, the materials compact over a number of cycles because the large double layer capacitance creates electrostatic forces that overcome the weak binding energy between the nano-crystallites. The battery materials for power cells are also subject to electrostatic forces that arise from volumetric changes created when the battery ions intercalate into the materials to change the oxidation state of the battery material. Both these forces may be sufficient to force the packing of the nano-structures to change thereby lowering the charge density and increasing the response time because the electrolyte cannot penetrate through the compacted masses. This process is irreversible.

To provide more structural stability, nanowire materials and the like can be synthesised, and wire arrays can be formed. The dimensional instability is reduced, but the materials are still susceptible to irreversible densification over many cycles. Alternatively, arrays of nano-materials have been synthesised as nanostructures from a stable nano-material as a template. The use of such synthetic approaches to grow a strongly bonded array of nano-particles from a template adds cost to the production process. While these materials may resolve the structural issues of weakly bonded aggregates, by forming a strongly bonded aggregate, the cost of such synthetic processes is such that synthesis is not desirable. It may be concluded that nanoparticle synthesis routes present serious challenges because aggregates of such nanoparticles are not structurally stable, and cross-linking and stabilising the particles is difficult to control.

Another approach is to produce the materials using lithographic techniques developed for the production of semiconductor materials. However, the width of the battery between the metal anode electrode, the anode paste, the separator mesh, the cathode paste and the metal cathode is the order of millimetres. These dimensions are impractical for lithographic techniques. This route is too expensive for batteries, where a large amount of material is required to store the charge.

A different approach has been to develop porous ceramic materials using conventional sintering from an initial aggregate of nanoparticles. In this approach, necks grow between the particles during sintering so that a 3-dimensional structure may be produced, and such necks produce materials with the required strength. However, the size of the nanocrystallite particles also grows during sintering and the nanoscale features of the bonded material is readily lost as shown by the decrease in surface area. For example, the sintering quickly removes the micropores to create mesopores because micropores have the highest surface energy. While there are techniques, such as laser sintering, that can reduce the time for sintering, these materials are relatively uniform, so that the close packed materials may not have a network of mesopores and macropores that can deliver the conducting ions to the surfaces sufficiently quickly.

There is a need to develop electrode materials for power cells that can intercalate the conducting ion, using a process which produces a porous strongly bonded powder particles on the size scale of 1-5 microns, with a porosity of about 0.3 to 0.6, with a network of pores that enable rapid diffusion of electrolyte into the particles, with a characteristic nanoscale crystallite length scale, with a surface area of between 50-300 m2/g, and a strength such that the materials do not fragment or restructure during multiple charging and discharging events.

The prior art describes many calcination processes for manufacturing battery materials, for example in pyro-processing manganese and lithium compounds together to form lithium manganese spinel materials for energy storage cells. These are generally roasting processes with long residence times, and are not the subject of this invention.

Flash calcination may be a process which in which powdered materials are injected into a combustion flame where they quickly calcine. However, the control of the calcination process is inadequate because the particles experience a wide diversity of environments in which the calcination and sintering processes described herein cannot be sufficiently controlled, such that the product powders are characterised by a broad distribution of the properties required for battery applications.

Rather, the calcination technology that has the means of producing the material with the desired properties has been described by Sceats and Horley (Australian Patent No. 2007233570) and Sceats et. al. (Australian Patent No. 2016904444), and which has been scaled up in practice for processing carbonate minerals to produce oxide materials at an industrial scale of about 5-10 tonnes per hour in a single reactor tube. That process is adapted in this invention for the specific production of powders for the manufacture of power battery cells.

Any discussion of the prior art throughout the specification should in no way be considered as an admission that such prior art is widely known or forms part of common general knowledge in the field.

SUMMARY

Problems to be Solved

It may be advantageous to provide for a process to manufacture anode and cathode powder materials for use in rechargeable battery cells.

It may be advantageous to provide for a process to produce materials for battery with a fast response so that the battery can deliver and absorb electrical energy quickly, for high power responses.

It may be advantageous to provide for a battery cell which comprises anode and cathode materials that each have a sufficiently fast response with respect to electrical charging and/or discharging.

It may be advantageous to provide a process for the production of battery materials that may have any such desired response through the control of the process.

It may be advantageous to provide for a fabrication process to provide for a material with a required flexibility. in combination with a high peak power delivery.

It may be advantageous to provide for a process to manufacture materials with a range of power delivery capabilities.

It may be advantageous to provide a process for production of powder materials of a specified composition without requiring nano-fabrication processes.

It may be advantageous to provide materials with a material with at least one of the following properties; high porosity, high surface area, high flexibility, high strength and, desired ion and electron conductivities.

It may be advantageous to provide a process that enables the powder materials to be bonded together into flexible sheets, and to other materials, to enable subsystems and composite structures to be fabricated by automated processes.

Means for Solving the Problem

A first aspect of the present invention may provide a process for producing a cathode or anode material adapted for use in the manufacture of fast rechargeable ion batteries, comprising the steps of:
  a. Selecting a precursor material that, upon heating in a gas stream, releases volatile compounds to create porous materials to generate a material compound suitable for an electrode in an ion battery;
  b. Grinding the precursor material to produce a powder of particles with a first predetermined particle size distribution to form a precursor powder;
  c. Calcining the precursor powder in a flash calciner reactor segment with a first process gas at a first temperature to produce a porous particle material suitable for an electrode in an ion battery, and having the pore properties, surface area and nanoscale structures for applications in such batteries;
  d. Processing the hot precursor powder in a second calciner reactor segment with a second process gas to complete the calcination reaction, to anneal the material to optimise the particle strength, and to modify the oxidation state of the product for maximising the charge density when the particle is activated in a battery cell to form a second precursor powder;
  e. Quenching the second precursor powder;

f. Activating the particles of the second precursor powder in an electrolytic cell by the initial charging steps to intercalate electrolyte ions in the particles.

The conduction ion may be lithium for lithium-ion batteries, magnesium for magnesium-ion batteries, and sodium for sodium ion batteries.

Further wherein the process is for producing cathode material. Preferably, the precursor material is a metal salt, or a mixed metal salt with a porosity is in the range of 0.01 to 0.03 and which is selected to have volatile constituents that may be calcined at temperatures below 900° C. to produce the porous residual material with a porosity in the range of 0.3 to 0.6, with a surface area in the range of 50 $m^2/g$ to 300 $m^2/g$, and a high capacity to intercalate the respective electrolyte ion as a cathode without structural failure over many cycles. The preferred precursor material may be a precursor metal and the precursor metal is a polyvalent metal such a nickel, cobalt, manganese or vanadium, and the salt constituent is an hydroxide, hydrate, nitrate, carbonate, hydrocarbonate, or an organic ligand. Preferably, the process gas streams may be pressurised air.

Further, wherein the process is producing anode material. The preferred precursor material has porosity in the range of 0.01 to 0.03 and which is selected to have volatile constituents that may be partly calcined in a reaction at temperatures below 900° C. to produce a porous material with a porosity in the range of 0.3 to 0.6, with a surface area in the range of 50 $m^2/g$ to 300 $m^2/g$, and a high capacity to intercalate the respective electrolyte ion as an anode without structural failure over many cycles. The preferred precursor material for an anode material may be an organosilicate material to produce a doped-graphite material, a silicon compound to produce a silicon material, or a titanium salt to produce titanium dioxide material. Preferably, the process gas streams may include air, stream, and reducing gas such as hydrogen, or syngas.

In another aspect there is provided, a process for producing materials for use in either a lithium-ion, magnesium-ion or sodium-ion rechargeable batteries or in a catalyst, that uses an externally heated flash calciner reactor to process a precursor powder in a gas medium into a product which is generally a combination of metal silicon oxides selected for the application of powder in these products.

Preferably, the composition of the precursor powder is determined by the application of the oxide product as a cathode material, an anode material, an ion conductor material, or a separator material for batteries, or a catalyst including an active catalyst and a catalyst support. Preferably, the precursor powder is synthesised to have about 30-50% of the mass as volatile components, and is ground to a particle size in the preferred range of about 0.2 to 100 microns before injection into the reactor. Preferably, the volatile components of the precursor is preferably $CO_2$ from carbonate ions, H2O from water of hydration or hydroxide ion, NOx from ammonia or nitrate ions or $CO_2$, CO, nitrous oxides, and sulphur oxides from organic ligands, which are removed in the externally heated flash calciner under conditions of flow rate, temperature and pressure in which the sintering of the oxide materials is minimised by limiting the temperature and residence time of the materials in the calciner. Preferably, the gas medium may be any of air, nitrogen, $CO_2$, steam, syngas, hydrogen or a hydrocarbon selected such that the multivalent ions in the precursor are processed to a desired oxidation states in the desired crystalline state. Preferably, the process conditions of the reactor in terms of temperature and residence time are selected to give at least 95% efficiency in the removal of the volatile materials, and a minimum residence time, typically less than 30 seconds, so that the oxide powder that is mesoporous, with a porosity in the range of 0.2 to 0.6, a surface area in the range of 15-250 $m^2/g$, and a flexibility characterised by a Youngs Modulus which is less than about 10% of that of a crystalline material of the same composition, and a high fracture strength. Preferably, a lithium ion cathode application may be a polyvalent metal such as nickel, cobalt, manganese or vanadium, or mixture thereof, and that the oxide powder is produced in an oxidation state and a crystal structure that can intercalate the electrolyte ion with a change in the oxidation state to store energy in the battery, with a high ion and electron conductivity. Preferably, a lithium ion anode application may be a silicon doped graphite material in which the precursor is an organosilicate compound, the gas medium is steam and the process is partial gasification. Preferably, a lithium ion conductors and separators may be oxides of aluminium or cerium oxide powder. Preferably, catalyst applications as an active catalyst material wherein the precursor contains catalytically active metals such as chromium, nickel, cobalt, manganese, titanium, vanadium, palladium or platinum. Preferably, catalyst support material for catalysts wherein the precursor contains magnesium, aluminium and silicon. Preferably, a number of segments in which the composition of the gas in each segment is varied by injection and/or removal of the gas between the segments to give improved properties of the oxide powder. Preferably, oxide powder at the reactor exhaust is rapidly quenched to limit sintering. Preferably, a hydrothermal synthesis process to produce the mixed metal precursor in which a single metal precursor is calcined and the porous oxide powder is mixed into an aqueous solution of dissolved salts, so that the cations and/or the anions from the dissolved salts are incorporated onto the particle, extraction of the doped particles as a mixed metal hydroxide or hydrated salts for processing. Preferably, for batteries, an intercalation process in which the porous metal oxide is mixed with a stoichiometric amount of the porous metal oxide of the desired ion cell, such as lithium oxide, magnesium oxide or sodium oxide, which is also produced, typically from a carbonate or hydroxide precursor, and the mixture is roasted for a minimal time and temperature under an inert gas atmosphere to produce the intercalated metal oxide for use in the battery. Preferably, a pyroprocess in which a number of materials produced using the process described in including the oxide, are mixed and heated to produce a stable intercalated metal oxide for use in the battery. Preferably, for battery anodes and cathodes, an electron conductivity enhancement process in which the oxide powder from the relevant is further processed by mixing the powder into a solution of an organic compound, such as sucrose, and the organic doped powder is recovered, dried and then processed in an entrainment gas of steam under conditions in which thin carbon threads are deposited in the pores of the powder for used in the battery. Preferably, a fusion process in which the powders developed in the relevant are mixed with proportions of small and large particles to give a high packing density into a layer of particles with the maximum particle-particle contact points, and the particles in the layer are fused together to make a flexible ceramic film. Preferably, a 3-d printing process, preferably a laser fusion printing process, which also enables multiple powder layers to be fabricated, with the flexibility of varying the composition of the film to integrate the functionality of the film.

In the context of the present invention, the words "comprise", "comprising" and the like are to be construed in their inclusive, as opposed to their exclusive, sense, that is in the sense of "including, but not limited to".

The invention is to be interpreted with reference to at least one of the technical problems described or affiliated with the background art. The present invention aims to solve or ameliorate at least one of the technical problems and this may result in one or more advantageous effects as defined by this specification and described in detail with reference to the preferred embodiments of the present invention.

BRIEF DESCRIPTION OF THE FIGURES

FIG. 1 depicts a schematic layout or drawing of a process forming a first preferred embodiment of the present invention; and.

DESCRIPTION

Figure 1:
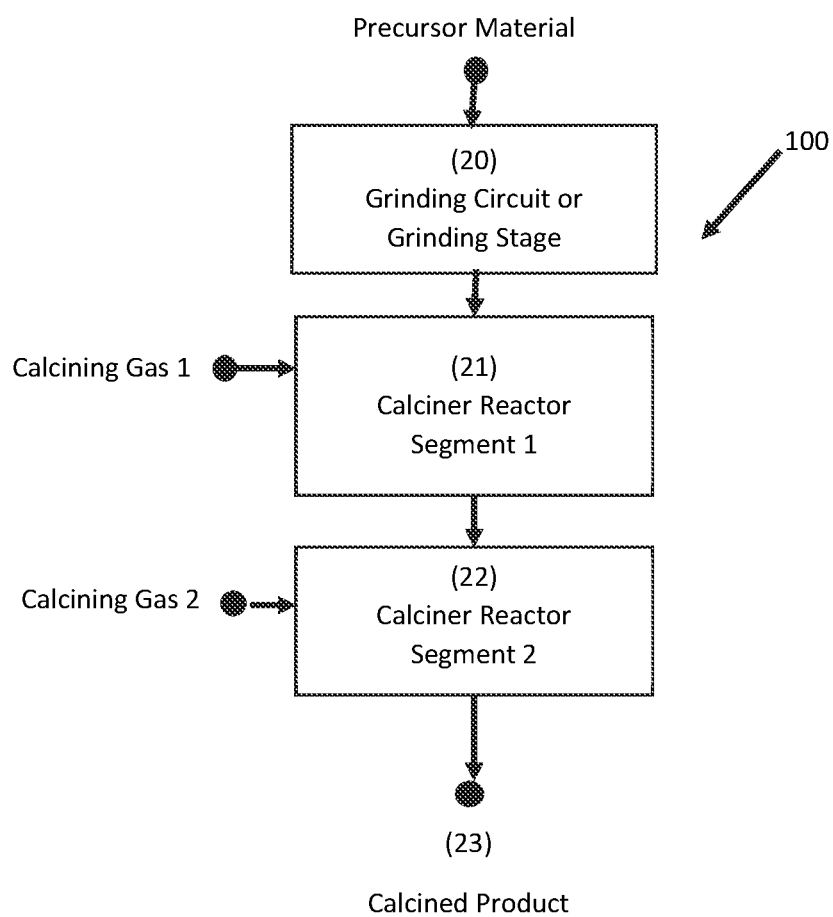

Preferred embodiments of the invention will now be described with reference to the accompanying drawings and to non-limiting examples.

The present disclosure is directed towards a process and/or a system for production of a battery, battery cell, energy cell and for components and materials thereof. Further, the system and method disclosed may allow for manufacture of materials, namely for the production of powder materials for battery sub-systems, such as anodes, cathodes, ion conductors, separators, and materials for catalyst subsystems such as catalyst blocks; and which also includes the processes that enable the production of sheets of the subsystems to make integrated devices.

A flash calciner is a type of calciner which can use indirect heating to produce high surface area nano-active powder materials, principally from flash calcining carbonate materials like magnesite, dolomite and limestone, and other minerals. The properties of nano-active powders include a high porosity, a pore high surface area, a high flexibility and strength, and can be used to make the materials in a form that enables the binding of the particles together to produce cements or ceramics. Examples of the material properties that can be obtained in these materials are given for the case of MgO from magnesite in which the particle size is typically 0.2 to 60 microns, the porosity is typically 0.4-0.6, the surface area is typically 150-300 $m^2/g$, the flexibility may be described by a Young's modulus of less than 10% of the crystal material, and the strength is such that the particle size distribution is not subject to significant comminution when ground. Further, the nano-activity facilitates the particles being bound to make structures with a variable strength up to about 40 MPa. It will be appreciated that other materials with desired material properties may also be produced by the system and/or method of the present disclosure.

In an embodiment, the flash calciner may be modified for the production of ion battery and catalyst powders and the production processes are described to account for (a) the general requirement that precursor materials must be synthesised (as they are not typically minerals, let alone naturally occurring), and (b) the multivalent metal ions in the processed powders must preferably be produced in a specific oxidation state and a particular crystal structure among the many that are stable, and (c) for batteries, the powders are preferably able to intercalate an active ion (generally lithium, magnesium, sodium) and (d) the powders should preferably be optimised to enable the binding of the powders together, or to other materials, for the manufacture of flexible sheets and shaped structures, to make battery and catalyst subsystems and devices.

For a particular material composition, the desirable properties of the calcined material are generally similar to those above for MgO material, except that the surface area may be reduced by the phase changes in the calcination processes which rapidly remove high energy crystal defects on surfaces. Nano-scale images of the powder materials show that the nano-scale grains in these materials are bound by thin necks, which provide many of the desired properties, and which are formed during the high temperature calcination process without the need for any nano-fabrication processes.

Many pyroprocesses, such as roasting particles, have been generally used to produce materials for batteries and catalysts, but these processes heavily sinter the materials and cause them to become brittle. The desirable attributes of a nano-active material are not obtained, or are lost. Flash calcination is a general rapid pyroprocess process in which powdered precursor materials are typically injected into a combustion flame where they quickly calcine by flashing off the volatile constituents to make a porous material. However, the control of the calcination process is generally inadequate because the particles experience a wide diversity of environments in the reactor, in which the calcination and sintering processes described herein cannot be sufficiently controlled, such that the product powders are characterised by a broad distribution of the properties required for battery and catalyst applications. Therefore, flash calciners have generally not been used to make powders for these applications.

There is a need for a flash pyroprocess that can produce nano-active powder materials from a precursor powder. The calcined material has specific composition including the oxidation state, a desired crystal structure, a high porosity, a high pore surface area, a high flexibility, and a high strength. The flash calciner has been further developed for this purpose, and deployed in a number of specific process steps described herein to produce such nano-active materials for specific applications.

The process may be used to manufacture a battery component including a catalyst. Many catalysts are based on materials that are used in batteries, and especially multivalent ions such a manganese, nickel and cobalt, as well as platinum and palladium. The processes described herein for battery materials and for battery subsystems may also be used to produce catalyst materials, and catalyst subsystems such as porous catalyst blocks.

Catalysts may include at least one of; aluminium silicates, alumina, mixed metal oxides, zirconia, metal doped oxides and zeolites. Other catalysts may also be generated from the process and/or system of the present disclosure.

Electrolytic capacitors which can be generated from the system may include at least one of a lithium manganese oxide, bismuth oxide, nanodopants, lithium cobalt oxide, nickel metal hydrides, zinc oxide, carbides and nitrides. Other materials may also be formed which may be used to form an electrode and/or anode of a cell.

Rechargeable (secondary) batteries have been developed for a variety of applications using a variety of materials as electrodes. The conducting ion is lithium, for lithium-ion batteries, magnesium for magnesium-ion batteries and sodium for sodium-ion batteries. Lithium-ion batteries are typically produced as either energy cells that are constructed for high energy storage characterised by slow charge and discharge rates, or power cells constructed for high peak power actions such as accelerating, braking and recharging in electric vehicles, characterised by fast charge and discharge rates. The response of power cells to the drive chain is generally managed by a battery management system, which controls the energy flows between these cells for the optimum overall performance. Further, the ion batteries may use nano-active materials as anodes, cathodes, separators and ion conductors, and catalysts may use nano-active materials as the catalyst support and also for the catalytically active materials.

The general methodology for such battery construction is exemplified by the lithium-ion batteries. These batteries are typically composed of (a) a lithium metal anode which is the source of lithium ions; (b) an electrolyte paste in electrical contact with the anode comprising an organic solvent for lithium ions, and where appropriate, carbon particles for electron conduction; (c) a separator, usually an organic membrane which passes the ions with a high conductivity and a high resistivity to the passage of electrons to limit self-discharge, and also which also stops the transport of fragments of the other materials to suppress short circuits; (d) an electrolyte paste as described above and (e) a cathode which is generally formed of crystalline metal oxide particles which reversibly intercalate lithium ions into the particles during the charging phase, and discharge them back to the electrolyte during discharge; (f) a metal collector which transmits the electrons around the electrical circuit, in order to charge the battery, or to provide electrical energy for a desired process.

There are many variations to this design and materials to deal with the many applications and issues associated with battery materials. For example, there are anode materials that also intercalate lithium ions. Also, the lithium surface may be stabilised by an ion-conductor material to minimise electron transport through the cell and which has the strength to prevent the formation of whiskers of lithium metal from the anode.

A major focus has been on the development of the cathode powder materials. The chemical composition of these powder materials are selected by their ability to intercalate the lithium ion, and this is achieved by selecting materials into which the lithium ions can be stored within the powder particles by a process called intercalation, whereby the lithium ions can reversibly move into and out of these particles, and the particles respond to the intercalation by changing their oxidation state through reactions which take electrons from, or give electrons to, the metal collector to complete the electrical circuit. Of significant importance is the charge capacity of both anode and cathode materials which is measured in amp-hours/kg of material.

There have been many cathode materials researched and developed for lithium ion batteries. These are generally metal oxides, and phosphates, such as lithium iron phosphate, nickel manganese cobalt oxides, nickel cobalt aluminium oxides, and lithium manganese oxides. For example, a range of cathode materials are based on manganese oxides, which can exist in many valence states as $MnO_2$, $Mn_2O_3$, $Mn_3O_4$, $Mn_5O_8$ and MnO, each with a wide variety of crystal structures, and some of which are characterised by channels through which a lithium ion can be readily intercalated and transported for storage, and others which are resistive to intercalation or how have low electron conductivities. The cathode materials may have a range of storage capacities that depend on the method of manufacture to get the required degree of intercalation, and in some cases the low rate of intercalation or electron transport is such that the battery power is low, and incomplete intercalation is often observed. A very significant characteristic of these materials is the rate of intercalation, which can determine the range of applications that can range from energy storage batteries if slow, to power batteries if fast.

Apart from lithium metal, there are a number of anode materials that have been developed for lithium ion batteries, such a graphite, silica doped graphite, doped graphene, lithium titanium oxide, and are there are those under development such as silicon. The examples listed above apply to the lithium ion battery, and similar examples apply to Mg and Na ion batteries, where the production of materials with a high intercalation rate is very challenging.

For electric vehicles, the battery weight is critical, so the charge capacity of the rechargeable anode and cathode materials are both desirably high. In addition, the desirable materials should be low cost, safe and, most importantly, must be stable over many charge and discharge cycles. The battery charge and discharge rates have a critical role to play in terms of vehicle acceleration and energy recuperation from deceleration, braking, and recharging.

The galvanic response for an energy storage battery cell is that the response of the cell to a charging or discharging current is one in which the cell voltage changes minimally. Thus the cell voltage is reasonably well defined, and is an important characteristic of the battery material. The electrode powder materials used in energy storage battery cells are generally characterised by large crystals of pure materials. The response of such cells is generally slow, primarily because of the slow diffusion of the conducting (lithium) ion through the large crystals for charging and discharging.

By contrast, battery cells that are designed for high (peak) power delivery must have a fast response, but also must also have a high charge capacity to sustain the response. The composition of the material may be similar to that used for energy storage, but modified to increase the intercalation speed. Because the intercalation of conducting ions into the powder materials is usually the rate limiting step for charging and discharging, the speed of the response is increased by decreasing the diffusion time of the lithium ions through the battery, and this can be best achieved by using porous high surface area materials in which most of the electrode material is found within small nano-scale grains, and these can be more rapidly charged and discharged. The characteristics of these materials is their very high porosity and high specific surface area, in $m^2/g$, which is preferably of the order of 50-300 $m^2/g$ compared to 0.1-1.0 $m^2/g$ for energy storage materials. A further characteristic of the materials is that they must possess pore channels that allow the electrolyte ions to diffuse quickly into the particle to access the pore surfaces, and this requires a pore structure with an appropriate distribution of interconnected macropores, mesopores and micropores which provide many routes to deliver not only the electrolyte ions to the grains throughout the particle, but also the electrons from the change of oxidation state. The response time of such a material can be orders of magnitude faster than those for energy storage because diffusion of the electrolyte ions is much faster than intercalation.

The fast response of the cell also requires the fast conduction of electrons to and from the cathode and the collector, and also to and from the anode to the collector (if the metal is not used). The use of carbon particles in the electrolyte is commonly used to provide a conduction pathway. However, these particles cannot easily enter the small mesopores of the material.

The high surface area leads to materials that have a very large capacitance from the electrical double layers of the electrolyte that form in the pores around the nano-scale grains, so that the galvanic response of the cell upon charge and discharge is a larger voltage change with the degree of charging, in contrast to the nearly constant voltage of an ideal energy storage battery described above. This capacitance contribution increases with the surface area, and can dominate the response, so that the cells for power are often called super-capacitors or ultra-capacitors. The charge density of these materials can exceed that of the bulk material because the double layer capacitance within the particle stores energy in addition to that from charge intercalation.

With respect to producing materials of a particular composition, a method of modifying porous materials called solution doping in which a porous substrate, for example manganese oxide, is placed in an aqueous solution of an different ion, such as a nickel salt, and the nickel is incorporated into the pores of the material, and the chemically modified porous substrate is recovered by filtering and calcination at a temperature to dehydrate/dehydroxylate the material to manufacture the mixed oxide material. It is desirable that the input material has a very high surface area to maximise the adsorption of such ions, and there is a need for a subsequent pyroprocess to produce the homogeneous powder also has a very high surface area for reasons described below. Alternatively, a roasting process can be used, but these have deleterious effects on the desirable properties for fast charge/discharge.

With respect to structure of the electrode materials, beyond that of storage capacity, are a fast ion intercalation rate, a high electron conductivity, and a high strength to limit degradation over many charge-discharge cycles. In order to maximise the ion intercalation rate for a given material, the principle is to maximise the surface area/volume of the materials and to optimise the porosity to allow fast electrolyte diffusion. The process may allow for nanoparticles to be produced by sol-gel, electrodeposition, or lithography, and to bind them into a porous aggregate in a nano-fabrication process to make micron sized materials appropriate for use in a cell. However, it has been found that such aggregates undergo irreversible structural rearrangements leading to compaction because the electrostatic forces from charging exceed the binding strength, so the structure collapses, and the battery performance degrades over a number of cycles. The collapse of aggregates has been mitigated to a limited extent by fabrication nano-wires, and by using templates to produce more ordered aggregates, and then cross-linking these.

Another approach may be to use ceramic production processes to make ceramic composite materials from assemblies of nano-particles or nano-wires, but the long time to grow the necks between the nanoparticles means that there is a loss of surface area and a loss of performance. There is a need to produce powder materials for electrodes, which do not rely on synthetic nano-fabrication processes, and most preferably to produce powders that can be readily bound into a flexible sheet, without pin holes, in a process that conforms to the desired battery structure, with the means of facilitating the assembly with the other elements of the battery.

If the intrinsic electron mobility in the electrode material is not relatively high, then the charge/discharge rate may be reduced in the battery because the carbon particles in the electrolyte cannot penetrate into the pore network described above leading to a decrease of the electrical conductivity of the electrolyte in the pores. Carbon particles can be inserted into nanofabrication processes to address this, but the nanofabrication process has the limitations described above. An alternative approach is to post-process the material to deposit carbon grains in the pores of the particle. The known art demonstrates that this may be achieved by doping the particle with an organic material such as sucrose, using, for example, solution doping, and partially gasifying the sucrose in a calcination process. Such a process should ideally not decrease the surface area of the particle by sintering, and the process must minimise deleterious changes in the oxidation state of the ions in the material. There is a need for a carbon deposition process that can produce an electrically conductive coating on the pores of the electrode material, and which minimise such deleterious effects.

The preferred features of ion conductive coatings for ion batteries is that the materials have a high ion conductivity, a low electron conductivity, sufficiently high elastic constants to inhibit whisker growth, and a high fracture strength to resist cracking from whiskers and from temperature induced stresses. The same production process for the composition of the powder material, and the production of strong powder materials described for electrode powders applies to ion conductors. The comments regarding the use of nano-fabrication processes also apply to ion conductors, and are exacerbated by the preferable benefit that such materials are applied for this function across much larger areas than the microns required for electrode powder materials. There may be a need to produce ion conductive materials with these desirable properties that do not rely on synthetic nano-fabrication processes, and most preferably to produce powders that can be readily bound into a thin flexible sheet, without pin holes, that conforms to the desired battery structure, with the means of facilitating the assembly of the battery with the other elements of the battery.

The preferred features of separators for ion batteries is that the materials have a high electrolyte conductivity, a pore structure that blocks the flow of particles of electrode materials, a sufficiently high Young's Modulus to inhibit whisker penetration, and a high fracture strength to resist cracking, including those from electrolytic forces, whiskers, and temperature induced stresses. Polymer based membrane separators have been developed over many years. However, there may be a need to increase the strength of the material to resist the tearing from whisker puncture, and to increase the temperature stability. Ceramic separators may have such desirable properties. There is a need to produce separator powder materials that do not rely on synthetic nano-fabrication processes, and most preferably to produce powders that can be readily bound into a continuous sheet, without pin holes, in a process that conforms to the desired battery structure, with the means of facilitating the assembly with the other elements of the battery.

All batteries require the accommodation of conducting ions to function. As such, it is preferable that such intercalation is carried out before the battery is assembled, because forced intercalation may fracture large crystals in the first cycle. A typical route to manufacture of such materials is to produce the powder materials without lithium ions, and then to insert the lithium into the powder in a subsequent production process, often in a pyroprocess, before assembling the battery materials. These are generally roasting processes with long residence times as current methods of rapid heat treatment are generally adverse to final product properties. For example, the lithium manganese spinel may be produced from a high surface area porous manganese oxide, and the lithium ion is then intercalated into the material by processing with a stoichiometric amount of lithium oxide to manufacture the desired a lithium manganese oxide. An example is the lithium manganese battery, in which the energy storage cathode material is, for example, a powder of manganese lithium spinel. In view of the above, there may be a need for pyroprocesses and materials that minimise the pyroprocessing time for intercalation.

The response time of an electrode is determined by the conduction of both ions and electrons in the material. An advantage of the nanoparticle synthesis material production process is that nanomaterials can be a mixture of electrode materials and electron conductive particles such as carbon, including graphene. While these mixtures of nano-materials may have the desirable attributes of high ion and electron conductivities, they lack the required dimensional stability as described above. Producing nano-scale carbon particles in electrode material powders may be achieved by calcining powders whose pores that have been partially coated with organic materials, such as sugars, in a gas under conditions where thin graphite layers are produced though the volatilisation of volatiles to produce syngas and char, with partial gasification of the char. Such partial gasification occurs in inert gases, generally including steam and some air, and is a known art. In this invention the flash calciner may be deployed to produce conductive carbon within the pores of the materials. Conductive carbon may include, graphite, graphene or any other carbon structure.

Turning to catalyst materials, the known arts of producing catalyst powders and creating pellets or permeable structures for fitting into systems, such as automobile exhaust systems to reduce $SO_x$ and $NO_x$ are well established. The performance of these materials and structures is optimised by (a) using porous particles with a high surface area for the active material; (b) optimising the structure of the particle and the assembly for high strength to handle the extreme conditions; (c) optimising the composition of the particle in terms of the catalyst support materials (which generally have an impact on the catalyst performance as an active material) and doping the materials with the active metal or metal or metal oxide; (d) binding the particles. There has been a growing use of nano-materials for new catalyst applications. For catalyst applications, the challenge that this invention generally addresses is the dimensional stability of such high surface area, porous materials as powders, and as bound aggregates. There is a need to develop alternative production technologies for catalyst materials that do not rely on synthetic nano-fabrication to produce high surface area composite materials.

This invention describes a process for manufacture of powder materials using the flash calciner to produce battery materials for use in sub-systems such as anodes, cathodes, ion conductors, separators, and to produce catalyst materials. Further, the invention describes how the powders can be produced to make thin flexible sheets of these materials, that can be bound together and with other materials to make an integrated device.

A flash calciner may be used to rapidly sinter a product for use in batteries to produce a powder material which meets the general specifications of a powder with a particle size distribution in the range of 0.2-100 microns in which the active materials for the application, are generally multivalent metal ions in an oxide form are in the molar chemical ratio and in a crystalline structure in (or on) nano-scale grains in material which has a porosity in the range of 0.3-0.6, with a surface area in the range of 30 to 300 $m^2/g$, with a flexibility with a Young's modulus which is less than about 10% of that of the equivalent structure, and a strength that resists comminution by grinding.

The precursor powder may be required to have at least one initial property before processing to manufacture a battery component, such as a desired porosity. To achieve a porosity target, the mass of the volatile constituents to the mass of the precursor must be about the same order as the porosity itself, corrected for the general situation in which the metals are heavier than the volatile materials. The volatile constituents are generally the decomposition products of anions of the metal (and silica), such as carbonates, hydroxides, nitrates, acetates as examples, but also includes cations such as ammonia and water of hydration. The decomposition reaction should preferably be in the range of 400-900° C. at 1 bar of gas.

The precursor powder material may be a material that has previously been processed in a flash calciner and then processed again in the flash calciner to produce the desired product.

In one general example of previous use, the product material generally must to be produced in a synthesis process in order to have the desired proportions of multivalent metals such as manganese, nickel and cobalt. In this example, a commercially available precursor such as manganese carbonate is used in this first aspect to make a powder material having small nano-scale grains and a high surface area that is used, in a subsequent solution doping process to absorb other metal ions into the material and the powder is reprocessed in the flash calciner to provide a homogeneous material with the other desired properties. An alternative approach to hydrothermal synthesis process is the use pyrosynthesis processes.

In another general example of previous use, it is desired to make heterogenous materials for the application. In one example, it is desirable to introduce conductive threads of graphite into the pores of the power material by a solution doping process using a soluble graphite precursor such as sucrose in which the input material is first prepared using this aspect and the material is then reprocessed in the flash calciner to partially gasify the sucrose to an electrically conductive graphite char. In another first process is used to produce a catalyst support material of an oxide of mixtures of aluminium, magnesium, silicon, and zircon with the desirable properties, and then add a layer of expensive heavy metals nickel, platinum or palladium materials onto the surface of the grains using soluble salts of these materials, and then reprocessing the materials under reducing conditions to produce the nano-grains of the metal.

Particle size distribution is essential for the process. A powder comprises a smaller particle size than a granule. A nanoparticle may have a smaller relative size range compared to that of a powder. For the operation of the flash calciner, it is desirable that the distribution has only a small fraction of particles near the lower limit (either powder or a nanoparticle) because these are most easily ejected in the gas streams from the reactor, and also that the distribution has a small fraction of large particles because these may quickly pass through the reactor without being calciner to the degree required. Less desirably, the particle fractions may be sieved before or after processing to meet other specifications arising from the use of the materials.

The calcination process of a flash calciner may use indirect heating to give a controlled wall temperature profile down the reactor, and a downwards flow of powder that minimises the recirculation of the particles. The gas stream may be co-flow downwards or counterflow upwards. The desirable features of this reactor for this aspect is that the particles are gradually preheated and gradually decomposed at a temperature just above the equilibrium temperature of the reaction, and a residence time of less than about 40 seconds, so that most particles see the same environment and that environment has a low residence time, low temperature that minimises the detrimental effects of particle sintering. Even more preferably the residence time is in the range of 3 seconds to 40 seconds.

The process may be integrated with other know processes described above such as hydrothermal doping for adding metals and graphite strings in the pores, but also with more conventional pyroprocesses such as roasting of two or more powder materials. In this invention, it is preferable that both the power materials have been produced by the flash calciner described herein, and the ratio of the masses of the powder should be in proportion to the desired stoichiometry of the products. The high surface area and pore networks in these materials maximises the surface diffusion of materials between particles and into the particles to minimise the deleterious effects of sintering. Sintering is an intrinsic part of such a roasting process, and the roasting time should be minimised. Steps to reduce this process time may be used. These include using an optimum mixture of particle sizes of each material so that the number of contact points between the particles is maximised; compressing the mixed power materials to also maximise contacts; and adding agents that facilitate the transfer of ions, but do not introduce a reduction of the performance. An example of such a process is pre-intercalation of lithium into the powder, wherein one of the materials is a lithium oxide produced from lithium carbonate in the flash calciner and the other material is an active powder formulated to be intercalated by lithium as part of its use, as in anodes, cathodes, ion conductors and separators. It is preferable that the lithium oxide is produced to have a smaller average diameter than the active powder so that the lithium powder occupies the interstices between the powders.

The innovations pertinent to the materials for batteries and catalysts pertain to the requirements to control the gas environment in the reactor. Specifying the gas so that the required oxidation state of the metal can be achieved is an important step, and in case of internal deposition of graphite in the pores of the particles, the gas is chosen to produce graphite strands within the particle pores. This choice of gas is matter of thermodynamics of the reactions which involves the material, the particle temperature, the gas composition, and the gas pressure. A further need may be the use of gases that minimise the sintering of the calcined product, which otherwise increases the grain size and grows the necks, and thereby degrades the properties that are desirable attributes. The deleterious sintering of oxide material is known to be generally catalysed by $H_2O$ and $CO_2$, so it is advisable to maintain a low temperature and residence time, low $H_2O$ and low $CO_2$ environments to minimise the sintering. One aspect to optimise the materials is to enable a switch of the gas in various segments of the reactor to optimise the reactor performance. In this respect, removing $H_2O$ and $CO_2$, if generated by the decomposition reactions, reduces sintering, and the lower partial pressure of the reaction gases also lowers the temperature that the calcination reaction can proceed. Therefore, the flash calciner design enables gas switching by dividing the reactor into segments by transferring gases from and into such segments during a passage of the particles through the reactor with minimal hold up so that the residence time is not substantially increased. The means of gas switching in powder flows are a known art that is controlled by the gas velocities in the reactor, and it is desirable to maintain gas velocities in the range of less than 2 m/s.

In addition, quenching of the powder may minimise the hold-up time of the particles at high temperature and in hot hoppers to minimise sintering. This is accomplished at the base of the reactor wherein the particles may be cooled preferably by heat transfer to a cooled reactor wall, preferably using a cooling reactor segment (or quenching segment) below the heated segments of the reactor. It will be appreciated that the heat transfer may be an indirect heat transfer. There are many means of cooling reactor walls, such as the use of water, blown air and/or heat pipes. The cooled powder may be collected at the base of the reactor in a hopper and removed from the reactor by any suitable conventional means, such as rotary valves.

In another embodiment of the present invention there is provided a process wherein the properties of the materials manufactured by the process may be used to fabricate flexible layer of any of the materials described herein. The first element of this is that the materials have a high flexibility associated with the porosity and the necks width allow large distortions to be accommodated, unlike fired ceramics with large necks that are very brittle. The process allows for materials grow the nano-scale grains or alter their grain structure dimensions during calcination with very few contact points between grains at the nanoscale, to give filaments that can move against each other to accommodate stresses. The Young's modulus is low, and is a general property that is independent of the particle size. This aspect aims to fuse the powder particles together so that this flexibility is conferred to films of the particles.

In another embodiment, the use of 3D printing processes may fuse particles together to form the film of a desired thickness and structure to be used in a device, such as a battery device. Unlike most 3D printing processes, there is no requirement to remove any powder from the process after printing, but rather to provide a process that binds particles together at a sufficient number of particle-particle contact points that the material can be formed as a flexible sheet. For example, the particles may be produced separately with two different particle sizes that are such, when mixed, there are sufficient smaller particles to fill the voids and provide particle-particle contacts so fusion will be effective in forming a strong film. Fusion printing applies a pulse of laser light that can result in the formation of necks at the contact points in a brief, local sintering process. This is a thermal activation process in which the duration of the heat pulse is milliseconds, so that large scale sintering within the particles is minimal.

The 3D printing process is such that depth of the films can be very large, and enables an integration of the subsystems, by changing the functionality of the materials during production, so that, in the case of batteries, each of the collector metals, anode, cathode, ion conductor, graphite particles, and separator powder materials, are "printing inks" that may be used in different amounts to build the device from a layering of the films with different materials in each. The liquid electrolyte, if required, may be drawn into the structure by the strong capillary forces in a secondary process stage.

FIG. 1 depicts a schematic drawing of the process steps for production of a powder material that has the desired surface properties, oxidation state and chemical valence and crystallite structure so that, when used in battery cells with the additional process step of intercalation, and with a battery management system, the battery may provide a very fast, controlled delivery of energy in a battery. This FIG. 1 describes the processes that occur in the calcination processes to make the specified powder materials, from grinding of a precursor, primary calcination reaction, secondary calcination and annealing, and quenching, which may alternatively be a quenching step.

Figure 2:
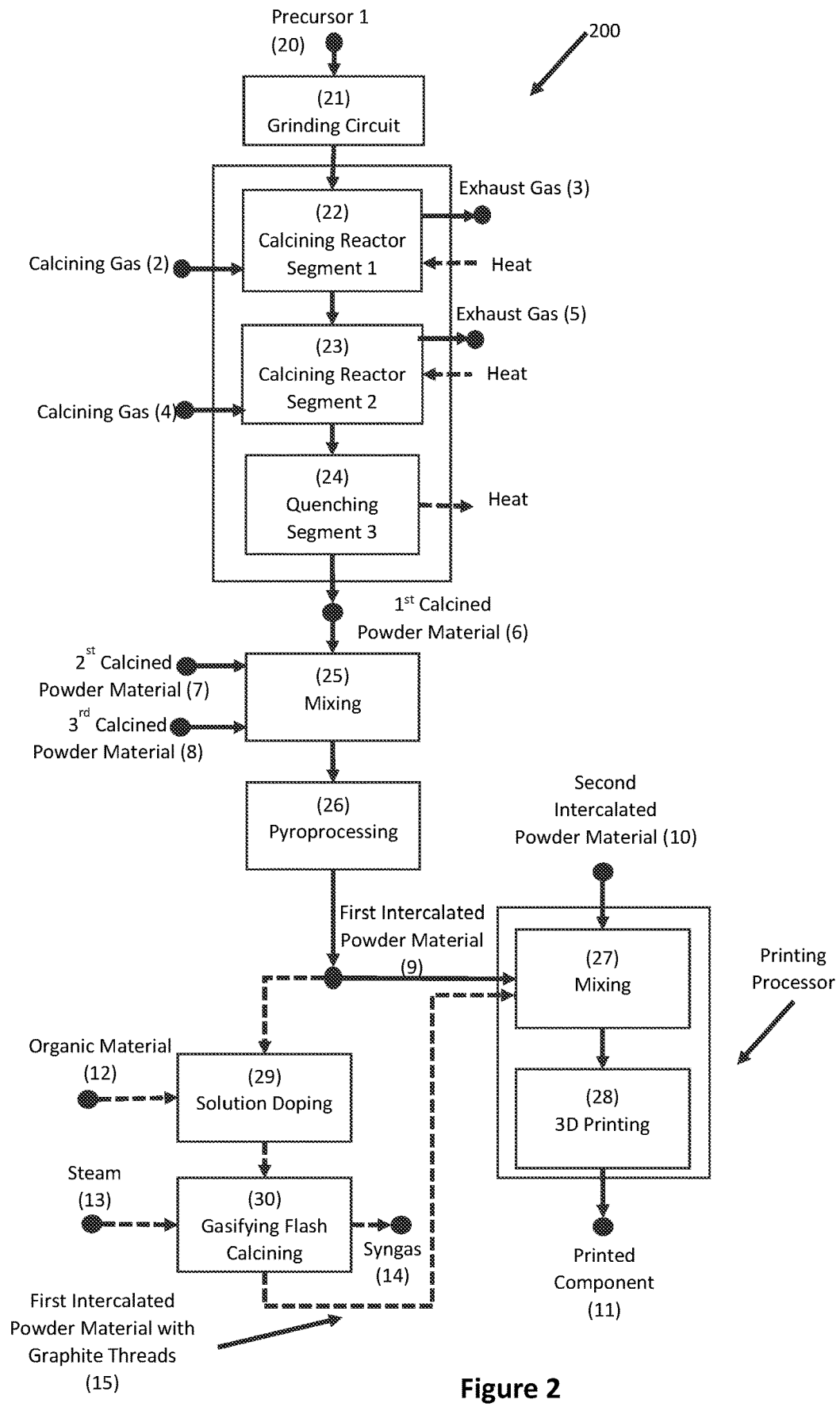
FIG. 2 illustrates an embodiment of a schematic layout of a process of the present disclosure.

Yet another embodiment of the present invention, as seen in FIG. 2, may provide for a process for producing a material from a suitable precursor compound for use in a battery as either an anode material or a cathode material comprising the steps of:

Step 1; Selecting one or more precursor compounds 20 in which the precursor compound contains constituent elements that may be removed in a flash calcination process by a thermally induced reaction to produce a porous material compound for use in a battery as either an anode material or a cathode material;

Step 2; Grinding the precursor compound to produce a powder with a predetermined particle size distribution, preferably in the range of 1-5 microns on the basis that the subsequent processes do not significantly change the particle size distribution 21;

Step 3; Calcining the precursor powder 22 in an appropriate first gas stream in an externally heated flash calciner at a first temperature to produce a calcined powder in which the volatile materials are substantially ejected from the particle through the calcination reaction, with an increase in porosity and a minimum of change in the particle shape. This process is controlled to deliver a porous material with a porosity of the order of 0.3-0.6, and with a very high surface area of the order of 50-300 m$^3$/g in which the micropore surface area is maximised, and in which the micropores are connected to the surface of the particle through an array of mesopores and macropores, and the calcined powder has a high strength through the continuous bonding of the material throughout the particle. This may further produce a material having the desirable pore properties, surface area, flexibility and strength for the intended application.

Step 4; Optionally, holding the first calcined powder, preferably at a lower temperature, and for a determined processing time in an appropriate second gas stream in which the oxidation state of the processed calcined powder material can be controlled through the oxidation or reduction potential of the second gas stream, and in conditions whereby the desirable pores structure is maintained, and the particle strength of the first calcined powder are not substantially diminished, and are preferably enhanced. This may complete a calcination reaction;

Step 5; Quenching the particle stream temperature so that the processes described above are quenched;

Step 6; Applying the powder particles to produce a battery cell as an anode or cathode powdered material, possibly in combination with other materials including electrodes, electrolyte pastes, and separator materials;

Step 7; Activating the particles in the cells for a number of cycles so that the conducting ion is intercalated into the particles, wherein one portion of the ions may be permanently intercalated and another portion of the ions may be charged and discharged for the battery operations.

The process steps 6, and 7 of applying the powder into a cell and activating the material by initial intercalation are added for completeness to illustrate that the material properties of the powders may be modified and controlled by the initial processing within the cell, which is therefore a significant aspect to be accounted for in optimisation of the particle properties from calcination.

Preferably, the step 4 of holding the calcined material in the second gas stream to the control the oxidation stage can be accomplished by the choice of the calcination conditions of Step 3 are such that Step 4 is not explicitly required.

The reactor designs are such that the holding time of the calcined material at any high temperature is minimised to minimise the degree of sintering so that the product powders retained the desired properties of nanoscale material clusters, a very high porosity, and a high surface area, while developing the strength of the material.

Another embodiment of the present invention may be used to fabricate an anode and a cathode material in the battery cell, each of which is separately manufactured using a process described herein.

Yet a further embodiment of the present invention may be used to fabricate particle materials used in the battery cells may be composed of mixtures of materials with different response times.

In yet another embodiment of the present invention, there is provided a reaction apparatus for producing the processed calcined power, comprising: A grinding circuit for the precursor materials to produce a precursor powder with the desired particle size distribution, an externally heated flash calciner reactor segment that produces a porous high surface area calcined power from the precursor powder in the first gas stream with minimum decrepitation. Optionally, a holding reactor segment in which the calcined powder is post processed in a second gas stream; and a quenching segment in which the powder is rapidly cooled so that any processes occurring in the holder reactor segment are quenched.

Optionally, the requirement of the holding reactor segment is not required if the required processing conditions can be substantially met in the flash calciner reactor segment.

The solution to the problem is generally described herein for the specific case where the conducting ion is the lithium ion, for use in lithium-ion batteries, and without limitation, the solution may also apply to the production of materials in which the conducting ion another ion, such as the magnesium ion, for magnesium-ion batteries and the sodium ion for sodium-ion batteries. The primary difference between these batteries is the material composition specifications, and the extent to which the conducting ion intercalates into the material. It is noted that there are designs for such batteries in which very little intercalation is required where the cells in the batteries are designed for a dominantly supercapacitor application such as for a high-power response. For example, a battery may be composed of lithium-ion cells for energy storage and magnesium-ion supercapacitor cells for power.

The desirable attributes of such a material from the manufacturing process are the production of materials with the following preferred desirable properties:— a. Powder materials with a chemical composition, which, in a battery cell as an anode or cathode, when mixed with electrolyte paste, can rapidly intercalate the electrolyte ion into the material to reversibly store a high charge density; and b. Powders with a particle size distribution between 1-5 microns so the materials can be used in conventional battery production processes; and c. Powders with clusters of material on the scale of nanometres which, in a battery cell, that can be rapidly charged by rapid intercalation from the cluster surfaces; and d. Powders in which the binding between the material clusters that are sufficiently strong that, in a battery cell, there is negligible irreversible change to the structure of the powder particles when the particle is charged and discharged over many cycles; and e. Powders with a porosity of between 0.3-0.6, with a network of interconnected macropores, mesopores and micropores which, in a battery cell, enable rapid diffusion of electrolyte into and out of the particles during charging and discharging, and to support a high supercapacitance storage of energy when charged to the battery voltage; and f. Powders with a specific surface area of between 50-300 $m^2/g$ which, in a battery cell, can enhance the speed of the electrolyte ion intercalation reactions into and out of the material clusters, and which can support a high supercapacitance.

Preferably, the materials will likely be chosen from those that have been proven as suitable electrode materials for energy storage battery cells, and the subsequent requirements are those that enable such materials to be used for power battery cells. The specification of the chemical composition includes the (distribution) of the valence states of the material and the (distribution) of the crystalline structures of the material.

The materials preparation may be completed in the battery itself, such as the intercalation of a permanent charge of electrolyte ion in the initial charging/discharging stages.

There are a variety of techniques that can be used to measure these properties of the powder, namely the porosity can be measured by the particle density, the pore properties and surface area can be measured by gas adsorption techniques such as the BJH technique and the BET technique, and by mercury porosimetry, and the cluster sizes and crystalline states can be estimated by X-ray techniques such as SAXS, WAXS, and powder diffraction, and by electron microscopy measurements such as TEM and SEM. For the prediction of the electrochemical properties in a battery cell, the distribution of valence states in the powder can be characterised by spectroscopies such as PES, XANES and EXAFS. For the analysis of the powder strength, the disintegration of the particles by jet impaction can be measured, and the elastic constants can be measured by AFM. Notwithstanding these powder measurements, the incorporation of the materials into an electrochemical cell and measuring the response to charging and discharging over many cycles will determine whether the powder material meets the requirements for use in power battery cells.

It may be possible for a battery cell to be constructed from a mixture of materials, such as a mixture of anode materials, and/or a mixture of cathode materials, so that a battery cell can provide not only constant energy, but can deliver and absorb also high powers. The present embodiments described herein is described in terms of materials that can deliver high power, and that should not be considered as a constraint on the same materials also being used to deliver low power energy.

The invention described herein produces processed powder particles that have all the desired attributes described above in a single flash calcination process, so that they can be incorporated into the battery with the need for minimal, and preferably no, subsequent processing (other than those specified for post-processing in the battery through intercalation). The particles must have the desired chemical composition and valence states, for either anodes or cathodes, and must also have the attributes of particle size, material cluster structure, porosity, pore structure, surface area and strength which enable their applications in power cells.

The primary requirement of the process is to generate a high porosity of the product material, in order to provide fast access of the electrolyte into the particle pores. Flash calcination provides this porosity by quickly removing volatile materials from the precursor particle at a reaction rate which is faster than the particle might shrink in volume from the loss of these materials. This may be achieved by flash calcination.

Preferably, the process is adapted to produce significantly different materials relative to a typical roasting calcination process, where the long duration, typically hours, at a specified temperature yields a specific crystalline form of the product. The product produced by known methods may be have a thermodynamically stable phase for the process conditions. However, in roasting, sintering is essential to form the crystalline materials, whereas in the process of this invention, the object is to produce porosity through the selection of a precursor, and to minimise sintering. Therefore, the current process preferably minimises the potential for damage of materials by reducing sintering.

A reasonable specification guideline is that the porosity of the processed particle should be in the order of 0.3-0.6. There are three contributions to the porosity—the initial porosity of the precursor, the porosity associated with the calcination reaction that removes the initial volatile constituents of the precursor, and the porosity associated with the secondary processes that are generally associated with the loss or gain of materials from reduction/oxidation reactions that are intrinsic to the production of anode and cathode materials at high temperatures.

A low porosity of the precursor means that the reactions occurs from the surface of the particle and proceeds inwards so that the reaction front moves through the particle as a shrinking core. A high porosity of the precursor means that the calcination and redox reactions proceed from the surface of the surface and all the internal pores of the particle. It is known that, to a good approximation, the reaction fronts move through the pores at about the same rate, in nm/s, so the particle is uniformly calcined if there are sufficient pores in the precursor. Importantly, the pore properties of the precursor largely define the pore properties of the product, and as explained above, these macropores and mesopores are important in the battery for delivery of the electrolyte ions into and out of the particle. The desirability of fast kinetics points the advantage of using a porous precursor for a uniformly calcined particle. Some surface porosity can be achieved during the grinding process. Preferably, the porosity of the ground particle before calcination should be in the range of 0.01 to 0.04. If the porosity is too high, the particles may be subject to decrepitation during calcination.

The porosity from initial calcination is defined to arise from the purposeful loss of volatile materials during calcination. For inorganic materials, the volatile elements may arise from water of crystallisation, hydroxyl groups, carbonate and nitrate groups. For organic materials, these are defined for convenience to arise from low temperature volatilisation processes of gasification, typically below 350° C., which leave behind a carbon char material containing any inorganic materials. The use of simple molecular models can be used to estimate the porosity from these reactions, and the precursor is chosen so that this is typically about 0.3 to 0.5. The selection of the precursors is primarily associated with achieving this porosity from the loss of volatiles. The primary reaction of volatilisation is usually a reaction that is not dependent on complex gas phase reactions, and occurs quickly once the calcination temperature has been achieved.

The porosity from secondary reactions arises from a subsequent reaction processes. Examples are the progressive reduction of multivalent metal ions with temperature, which is typical of cathode materials, and the gasification of chars typical of anode materials. These reactions may be slow, and require secondary processing, and may not significantly occur during flash calcination. The secondary processes of interest may include re-oxidation of the multivalent ions so that the intercalation of lithium ions can be optimised. Such processes can be controlled through reactions with gases added to the reactor. The porosity change from these processes is typically below 0.2. The selection of the precursor generally requires a detailed assessment of the various processes, and the kinetics thereof, and the extent of the reactions. Much is determined from the literatures of mineral calcination and maceral gasification. This is best illustrated by example embodiments.

The calcination process described herein uses a first stage of flash calcination of a ground precursor material using controlled indirect heating from the walls of a reactor. The basis for a flash calcination is to operate a calcination reactor segment at high temperature where the reactions of the primary calcination processes, of removing the initial volatile materials, occur in a very short time, such that the sintering processes that lead to the subsequent loss of the desired surface area are minimised. The most desirable process is one in which the temperature of the particle is gradually raised and the temperature at the exhaust of this segment is preferably the highest temperature experienced by the particle, so that the entire process of calcination and sintering in that segment can be managed.

The flash calciner design is based on that described by Sceats and Horely. It is preferable that the dominant calcination process occurs at a temperature in the range of 650-900° C., where the volatilisation reaction is sufficiently fast such that nearly complete calcination can be achieved with a residence time of about 30 seconds, and preferably in about 10 seconds, and the sintering process is sufficiently slow that the loss of the micropores, formed by calcination of the volatile constituents, by sintering is minimised. The competition between calcination, desirably fast, and sintering, desirably slow, is important. In some cases, the calcination kinetics process can be accelerated by the presence of steam as a catalyst, and generally the reaction rates may be controlled not only the temperature, but also by the gases used to entrain the ground particles in the reactor. In other cases, gases such as steam and $CO_2$ catalyse sintering.

The particular calciner design that has proven to be superior in the initial calcination process is a Downer reactor in which the particles become entrained by the both injected gases and later by process gases produced during calcination. The flow rates of the particles and gas should preferably be less than about 1 m/s, and more preferably less than 0.3 m/s, and this is readily achieved by particles ground to 1-5 microns. The heat for calcination is drawn from the radiative heating from the reactor wall, which could be a steel tube, or a segmented steel tube, or another suitably radiative surface. If steel is selected for the reactor walls or a portion of the reactor, it should be able to be heated up to about 1050° C. to avoid stress related issues of steels at higher temperatures. The particles may be preheated before injection into the calciner reactor. The heating of the reactor wall may be from a combustor or from electrical heating elements. The sensitivity of the calcined particle properties to the calcination process is such that the wall temperature distribution along the wall should be controlled to within +/−5° C. The height of the calciner reactor segment is preferably about 10-40 meters. As described above, the desirable gas for injection into the reactor can be chosen to control the calcination process. The desired degree of volatilisation is preferably about 95%, and most preferably about 98%.

The flash calcination produces a porous material with a high surface area and nanoscale clusters of material. Therefore, these materials have very little long range order, most akin to an amorphous material. With respect to strength, the absence of long range order inhibits the usual fracture mechanics of crystalline materials because there are no crystalline planes in the material that can lead to propagation of a defect in the network. Recall that a primary requirement of a material for a fast response in a battery is that it is can expand and contract to intercalate the electrolyte ions without fracturing the particle, so that the material produced by a flash calcination process with no long-range order may have this desired attribute.

A feature of the application of flash calcination technology to the production of anode and cathode materials is the ready change of valence state of the central atoms. For cathode materials, the central atoms are multivalent ions such as nickel, iron, cobalt, manganese and vanadium, and for anodes the carbon-, silica- or silicon-based materials. At high temperatures, the oxidation states of these atoms readily change with temperature. With metal oxide materials for cathodes, the oxides that are formed from the loss of the volatile materials can be formed in many oxidation states, and as the temperature rises the stability of these oxides change, generally by a progressive loss of oxygen. The primary volatilisation reaction is to create porosity, and the secondary reactions in this case cause additional porosity and a change of the ion valence. For carbon-based anode materials, the primary volatilisation reactions are those that lead to the formation of a carbon char, and these reactions are primarily controlled by the temperature and the gases introduced into the reactor to promote these reactions, typically steam, syngas, and hydrogen and some air (if required). In this case the aim is to further increase the porosity without loss of surface area from sintering. However, some loss of surface area may be accommodated by a strengthening of the binding between the nanoscale clusters of the material, in an annealing process to form stronger necks between the clusters within the particles so that they may more readily withstand the stresses of intercalation. For silicon-based anode materials, the effect of intercalation with lithium is severe because of the high affinity with lithium.

The control of these secondary reactions and annealing is undertaken in a secondary reactor segment, typically with a longer residence time, and thus at a lower temperature to minimise undesirable sintering, and with gasses added to control the reactions to ensure that the processed material has the optimum properties for intercalation of the electrolyte ions during charging and discharging. For cathode materials, the intercalation is forced by charging, and for anode materials, the intercalation associated with the discharge of the electrolyte ion from the material. The role of the secondary reactor is to manage and control the redox reactions that are associated with multivalent metal ions and in carbon or silicon materials to optimise the intercalation of the ions. The secondary reaction and annealing conditions are chosen to maintain or enhance the surface and strength properties of the material.

The final process of the reactor is the quenching of the temperature of the product material to quench the reactions taking place in the secondary reactor segment so that the product has the optimum properties. The cooling rate is chosen such that the product maintains its strength. The process may improve the properties of the particles by a controlled degree of annealing, albeit with a controlled degree of sintering.

The reactor processes to manufacture the materials from a ground precursor include a fast, short primary calcination reaction process at high temperature to create porosity from volatilisation; a secondary reactor process for further reaction and annealing the material for optimisation of later intercalation; and a quenching process.

A further embodiment described below is for cathode applications, and the cathode material is a manganese oxide, before intercalation. Manganese oxides materials exist in a wide range of oxidation states and in a wide range of crystal structures. Research has shown that some of these structures allow facile intercalation of lithium ions into the crystals, such as spinel structures, through sufficiently wide channels in those crystal structures, and these materials are widely used in primary and secondary (rechargeable) lithium-ion batteries. For energy storage batteries, the initial permanent lithium in the material are preferably formed in the initial crystal structure during production, so the chemical formulation of the processed particle is $Li(MnO_2)_2$. This strategy can yield structures into which additional, mobile, lithium ions can later be intercalated in a charging process characterised by the reversible reaction $$Li(MnO_2)_2 + Li^+ + e^- \rightleftharpoons \#Li_2(MnO_2)_2$$

in which the average valence state is lowered from 3.5 to 3.0 by charging.

However, in the case of power batteries, the initial intercalation of the initial lithium ion can proceed in the activation process stage, as $$2MnO_2 + Li^+ + e^- \rightarrow Li(MnO_2)_2$$

Thus the initial material to be prepared from calcination is manganese dioxide, in which the formal, average, valence of the prepared material is preferably initially 4.0, and the initial intercalation of lithium during first charging reduces this to 3.5, and the reversible intercalation of lithium during charging further decreases this to 3.0.

The system process may produce or use a large number of stable mixed valence manganese oxide compounds from $MnO_2$, $Mn_2O_3$, $Mn_3O_4$, $Mn_5O_8$ and MnO in which the Mn atoms have valence states that range from IV to II, in which most of these compounds have mixed valence states. Generally, Mn(IV) ions have short range order characterised by $MnO_6$ octahedrons, while the Mn(II) ions are characterised by short range order local $MnO_4$ tetrahedrons, and Mn(III) has an intermediate short range order best described as distorted octahedrons from the Jahn-Teller distortion. There are many crystalline forms of each of these materials which are associated with the different orientations of this short range order. For example, $MnO_2$ can exist in many forms, namely $\alpha$-,$\beta$-,$\gamma$- as the chain-like crystals, $\delta$- as the sheet-like crystals, and $\varepsilon$- and -$\lambda$, as the 3-d phases, that are differentiated by the long range orientations of the $MnO_6$ octahedrons in these crystalline forms.

Whereas the consideration of crystalline states and manganese valence is critical to the performance of an energy cell, the requirement for a power cell are less demanding with there being no requirements for long range order, and the valence state requirements are reduced to average values. In effect, the preferred valence state for the material prior to intercalation is about 4.0, and the average after the intercalation of the permanent lithium is about 3.5, and the average when fully charged is about 3.0.

The strategy starts with the selection of the precursor material. The concept is to start with a precursor in which the precursor compound contains other constituents that become volatile upon heating, and are thus readily removed during calcination. Typical constituents are carbonates, which decompose to release CO or $CO_2$ and form the oxide, hydroxyl ions that release stream, nitrate that releases nitrogen oxides, and other organic constituents such as acetate and citrate ions that break down to produce $CO_2$ and steam, and water of hydration that is also released as steam. These materials are commonly available as precursors for battery materials. They have been synthesised using standard processes from manganese oxide, produced from manganese bearing minerals through a number of mineral processing steps. Simple molecular models can be used to estimate the porosity of a calcined particle on the basis that the calcination process described below occurs with negligible change in the particle size. Generally, a porosity of 0.3-0.6 is achievable without significant particle decrepitation during calcination by the choice of the precursor.

One characteristic of the precursor material is the porosity of the precursor before calcination. This is preferably in the range of 0.03 to 0.08, and is preferably in the form of mesopores and macropores. These are formed by the method of production of the precursor, for example, by rapid precipitation reactions during production. The final pore distribution after grinding and calcination may evolve during these processes as described below, but the advantage of a porous, but strong, precursor is always preferred. Therefore, the preferred precursor is a material with volatile constituents that can be removed by a flash calcination process, and which has some initial porosity.

The next step in the process, is to grind the materials to the desired particle size distribution. On the basis that the decrepitation of the particles in the calcination process is not significant, the desired particle size distribution from the grinding circuit is a distribution in the range of 1-5 microns, so that the subsequent production process of the battery cell can use the known art. The circuit includes crushers, grinders, and recirculating filters. Such circuits and equipment are known in the art, such as Raymond rolling mills. The grinding process may fracture the materials within the particle, and these fractures may contribute to the pore properties of the product. The choice of grinding process to achieve such fracturing, without subsequent decrepitation, is a known art. The grinding process itself may lead to the material becoming amorphous.

Consider the embodiment case in which manganese (II) carbonate $MnCO_3$ is chosen as the precursor. The process decomposes to manganese (IV) oxide, $MnO_2$, by the redox reaction that commences at about 200° C.

$$MnCO_3 \rightarrow MnO_2 + CO \text{ at around } 200° \text{ C.}$$

In air, the CO is oxidised to $CO_2$. The $MnO_2$ has the ideal valence of 4 required for later intercalation of lithium. However, at temperatures, above about 470° C., the $MnO_2$ progressively loses oxygen and an amorphous, mixed valence material is produced at about 760° C. characterised by loss of oxygen and the generation of significant amounts of oxygen vacancies.

Most generally, a flash calcination process may occur sufficiently quickly that there is no time for long-range order to be established. The desirable crystal structures for energy storage cells are well understood from their different abilities to intercalate ions. However, for power cells, the absence of long range order per se has little impact because the diffusion lengths required for intercalation are the order of the nano-scale crystallite size, and there are many diffusion pathways available for intercalation that long range order has little importance.

The initial loss of the CO, and the subsequent loss of oxygen creates a very porous material, when cooled, has a surface area in excess of 250 m²/g formed from nanoscale material clusters. That material is also found to be very strong. It is apparent that the flash calcination process eliminates the CO very quickly. The rapid elimination of volatiles via weak pathways in the material leave the strongest clusters. The process, with a residence time of between 10 and 40 seconds, is also sufficiently long that the clusters have sufficient time to form strong, annealed, necks between the clusters so that the material, when cooled, does not readily fragment.

As the temperature increases, the oxides become increasingly unstable to give a range of materials that are often mixed valence oxides. The material, while polyvalent, has an average oxidation state close to 3, more typical of $Mn_2O_3$, so that the removal of oxygen is approximately represented by the reaction.

$$4MnO_2 \rightarrow 2Mn_2O_3 + O_2 \text{ at around } 750°\text{ C.}$$

Thus, the flash calcination process described above cannot readily control the oxidation state of the material, which is nominally close to 3, as in $Mn_2O_3$. Generally, the material has an average valence state closer to 3.0 than the most desirable value of 4.0 for the calcined material.

The flash calcination process at 760° C. is attempting to achieve many objectives, such as high degree of calcination and a very high surface area. To achieve the most desirable oxidation state of 4, the calcined material is held in a holding segment of the reactor at a lower temperature where it is re-oxidised from 3 to 4. It will be recalled that the desired valance state of the material prior to intercalation is 4.0, and 3.0 is the valence state of the fully charged material. Thus, the second stage of the reactor re-oxidises the material to a valence state of about 4.0. This is achieved by cooling of the material from about 760° C. to below 470° C., where the reverse reaction occurs.

$$2Mn_2O_3 + O_2 \rightarrow 4MnO_2 \text{ below } 470°\text{ C.}$$

The gas stream in this process is ideally air, or oxygen, and does not include other materials that may react and bind to the product. The recombination of oxygen decreases the surface area and the porosity, and the residence time is selected to minimise sintering of the material, yet allow re-oxidation and some annealing for strength development. The preferred operating temperature for the reaction stage is about 440° C. The residence time is chosen so that some annealing of the reformed oxide maintains the strength.

It is emphasised that the choice of precursor, and the gas in both stages of the reactor, may have a significant impact on the results. The short residence time and high temperature of the calciner segment provides for a rapid reaction which opens up the pore structure of the material, yet is sufficiently long that the material produced can be rendered to be structurally stable by the formation of necks between the clusters. The longer residence time and lower temperature of the holding reactor segment allows control of the oxidation state of the material to later optimise the intercalation of the lithium ion in the cell, and annealing with minimal sintering of the material, but also allows for completion of the calcination reaction.

The X-ray diffraction pattern may range from being that of an amorphous material, if the disorder is the very high without any discernible diffraction peaks, to one in which the diffraction peaks are considerably broadened from the limited crystallite size and from lattice distortions within a nano-scale cluster. It is noted that there may be distinct advantages in batteries for the use of amorphous materials. These are not susceptible to phase changes of the crystallites driven by Jahn-Teller distortions, and the high disorder may lead to an increase in the intercalation of the conducting ion in the battery.

Sintering and annealing increases the pore size of the mesopores so that the most desirable pore structure may be achieved by some sintering to allow better access to the materials by the electrolyte. It is noted that the fast calcination process promotes a pore volume distribution that facilitates the rapid exhaust of the gas from the particles, so the calcination process itself develops a pore structure that is not inconsistent with that required for diffusion of electrolytes through the structure. The optimum distribution of pores is that in which the pore volume between micropores, mesopores and macropores is distributed, and the surface area and volume of the nano-crystallites is such that intercalation proceeds on a timescale comparable to diffusion of the electrolyte to the nano-crystallites.

The strength of the porous $MnO_2$ is determined by the strength of the necks or bridges that bind adjacent nano-clusters. Amorphous materials are generally characterised by high strengths because there are no crystalline planes that can fracture and porous materials are very difficult to break because the structure has enough space to deflect without inducing strain that would fracture a crystalline material. This amorphous structure is ideal for power cells because there are substantial volume changes associated with both ion intercalation and electrostatic forces from the double layers that develop through the supercapacitance. The high strength of the powder, and its ability to resist fragmentation are important properties of the process described herein. In effect, the necks adjacent nano-crystallites and formed during calcination and annealing by mass transport. The necks are most likely to be amorphous, and remain so during post-processing because there is only a small driving force to orient the nano-crystallites in these necks, as is observed during the production of porous ceramics.

The production of metal oxide cathode materials can produce materials with the most desirable attributes for charge density and strength with a fast response. The charge density is generally higher than that of the macroscopic oxide particle because the porous material becomes a supercapacitor from intercalation, as well as from the build-up of charge layers through the double layer organisation of the electrolyte in the pores.

A further embodiment of the invention is the process for manufacture of fast anode materials. The principles for the process are similar to those described in the first embodiment, and the primary difference is in the details of the materials used, and the modification of the processes to take account of these differences. Firstly, the anode material most widely used in lithium ion batteries is a graphite anode, and generally this anode is comprised of carbon black, which has a good electrical conductivity. These materials generally have fast kinetics for intercalation because these materials generally have a reasonably high surface area. Thus the response time of many batteries is determined by the cathode materials response, so that the primary focus on achieving a fast response has been to improve cathode battery materials.

However, the charge density of graphite is not very high, and these needs to be improved to minimise the amount of anode material, while maintaining the fast response. It is known that the anode charge density can be improved by using a porous ceramic-like materials that contain the C, with Si and O atoms, and also with some residual C—H hydrogen groups. The stronger binding of lithium to these materials increases the charge capacity. In this embodiment, the flash calcination process is described which produces such materials with the same beneficial properties as described for cathode materials.

The choice of precursors for this application is very broad because the general process is to use a pyrolysis process to make the materials from a silico-organic precursor. The organic constituents are chosen such that they vaporise at about 300-450° C. during flash heating in steam, to produce a wide range of products including syngas and volatile tars, leaving behind a solid material comprising the silicon as a silicate, and graphite in which the graphite contains residual amounts of oxygen in the carbon rings, and bound hydrogen as C—H. In pyrolysis, the graphite can continue to be oxidised so that the char/silica composition is optimised.

The flash calciner reactor, which may optionally be a Downer flash calciner, may be used as a pyrolysis system by entraining the ground precursor in steam and air mixtures, and heating the materials in the reactor segment to induce the gasification reactions to remove the volatiles in the first reactor segment. In this case, the size of the input particles may be larger, to account for the reduction in particle size observed during pyrolysis. The entrainment gas is typically steam or air/steam mixtures.

The particles are entrained in the pyrolysis and the input gas streams and after the volatiles are released, the chars begin to get consumed. The release of the volatiles leads to highly porous particles with a surface area of order 200-500 $m^2/g$.

In the second reactor stage, the gas composition can be changed to further complete the pyrolysis of the graphite-silicon residue to achieve a desired C:Si:O ratio, while preferably increasing the surface area. For example, the entrainment gas may contain syngas or hydrogen which accelerates the gasification of the graphite, and further removes tars. The process develops a porous particle with an appropriate pore distribution and a high surface area of exposed C, Si and O atoms. The particles are strong because of the same reasons considered above for oxide materials, and the particles are intrinsically amorphous.

There may be sufficient degrees of freedom in the two calciner segments to produce a powder material with the desired particle size, porosity, surface area and oxidation state to provide a high lithium intercalation and a high supercapacitance in an intercalation process in the battery.

On the choice of the precursor material, it has been found that natural products, such as rice hulls can be processed to give a material with these desired properties, when washed in a weak acid to remove other ions such as sodium and potassium if required, and to pre-dose lithium ions. Rice hulls are rich in silica. If the gasification process is taken to its limit, the material produced is a white high surface area amorphous silica material. Partial calcination leaves a black to grey material depending on the residual carbon desired to be left in the material. The areas of carbon and silica are generally well mixed, as the carbon bound to silica resists gasification. The control of the process allows the production of a porous amorphous material with a sufficiently high electrical conductivity and a high intercalation capacity for the lithium ion.

The processing of organo-silicate precursor in the flash calciner acting as a gasifier, can produce materials with the most desirable attributes for change density and strength with a fast response. The charge density is generally higher than that of the carbon black macroscopic oxide because the composition of the pores intercalates more lithium ion and, like carbon black, the material becomes a supercapacitor through the diffusion of electrolyte into and out of the pores. Washing of the material may be required to remove impurities, such as sodium and potassium.

Further, FIG. 1 depicts a schematic drawing of a process for production of a powder material from a precursor material in which the powder particle size, porosity, surface area and oxidation state are optimised by a primary volatilisation calcination of a precursor, a second reaction and annealing process, and a quenching process to form a powder suitable for incorporation as an anode or cathode material in a battery cell, wherein a final step, not shown in FIG. 1, of initially intercalating the conducting ion species into the material is accomplished. The manufacturing of a battery from the powder materials is a known art.

In one embodiment, the process 10 comprises the following steps:—the precursor, Calcining the ground material in a first calcination gas at a first temperature, Calcining the ground material in a second calcination gas at a second temperature, Quickly quenching the temperature of the material. Optionally, calcining at a first and a second temperature may occur in a single step.

In another embodiment shown in FIG. 2, the process 200 comprises the development of a printed component 11 from a precursor 20 through steps to produce a first calcined powder material 6 which is processed with other calcined process materials 7 and 8 to produce a first active intercalated material 9. The production of the printed component is described by a process in which the first active intercalated powder material is mixed with a second active intercalated material 10 and fused.

The example is applied to the production of a lithium nickel manganese spinel cathode sheets. The process steps include the steps of; Selecting the precursor 20 material. Preferably, the precursor is manganese carbonate, such as $MnCO_3$. Grinding the precursor to the desired range of 10 microns to 40 microns. Feeding the precursor into said flash calciner. Calcining the ground material (ground precursor) in a first calcining gas 2 at a first temperature in a the first reactor segment, where the gas is the $CO_2$ released from the decomposition of $MnCO_3$ and extracted as gas 3. Feeding the material from the first segment into a second calcining segment. Calcining the ground material in a second calcining gas 4 at a second temperature in the second reactor segment, wherein the second gas may be air, and the extracted gas 5 which may be hot air or a released gas from the material being calcined. The reactor settings for the production of $Mn_3O_4$ are such that an exhaust temperature between 350° C. and 450° C. is most desirable for residence times up to 40 seconds and temperatures up to 650° C. are acceptable for residence times of 3 seconds. Feeding the material from the second segment into a third segment. Material may be gravity fed or fed via a fluid flow. Quenching the temperature of the material (from the second segment) in the third reactor segment to produce the first calcined material 6 including $Mn_3O_4$.

It will be appreciated that $Mn_3O_4$ has at least one desirable property for batteries or cells. Further, It will be appreciated precursors may also be ground to the micron range of 0.1 microns to 10 microns, or in the range of 40 microns to 100 microns, rather than the 10 to 40 micron range. Having a wider range of micron sizes allows for mixing of particles to fill voids between particles, particularly once the precursors have been calcined and subsequently mixed, as discussed below.

The process may continue with the following steps if further processing is required. Mixing the first calcined material 6 with other calcined NiO 7 and calcined Li$_2$O 8, in the stoichiometric proportions so that the first intercalated powder material has the desired composition, in this case the spinel structure LM$_x$Mn$_{2-x}$O$_4$ where M is a transition metal. In this embodiment the transition metal is Ni, and the most desirable composition is x=0.5. In this embodiment. The NiO 7 may be produced using the flash calciner process by calcining the precursor Ni Acetate and the Li$_2$O 8 may be produced in the flash calciner process by calcining Li$_2$CO$_3$, both using the three segment process described above. The desirable composition of the mixture is in the range of x=0.4 to x=0.6, but more preferably x=0.5. Pyroprocessing the mixture (6, 7, 8) under Argon for a period of time between 0.5 hours to 48 hours at temperatures in the range of 600-900° C., to produce the first intercalated powder material 9 and then cooling slowly to produce a spinel.

Preferably, the period of time is between 0.5 hours to 3 hours. The period of time may also be between 3 to 8 hours. The period of time may be in the range of 8 to 48 hours. Pyroprocessing times may be manipulated based on a desired output, and may depend on pressures, temperatures, volume of material, volume of argon and particle size. In one example, the spinel produced is LiNi$_{0.5}$Mn$_{1.5}$O$_4$.

A printed material 11 may be made using the following process. Mixing the first intercalated material 9 with a second intercalated material 30. Processing the mixed materials into a 3D Printer which fuses or otherwise binds the powders to form a printed component.

For example a LiNi$_{0.5}$Mn$_{1.5}$O$_4$ cathode material may be used. If required, gums or resins or other materials may be used to facilitate binding of cathode material or other desired material.

Preferably, the first intercalated material 9 and the second intercalated material 30 have generally the same composition, but differ in particle size distributions. In this way a bimodal distribution may be achieved with the intercalated materials 9, 30 which provides a higher packing density of the powder and increases density of contacts between the particles.

In one embodiment, the flash calciner process for making the each of the Mn$_3$O$_4$, NiO and Li$_2$O is that each particle has a high surface area. Preferably the Mn$_3$O$_4$, NiO and Li$_2$O are powders. At contact points of the powder the surface diffusion of the ions to make a spinel or other stable structure is such that the mesoporous structure and the nano-scale grains of the materials are maintained by limiting the sintering of the material. A similar principle, of using the high density of contact points of high surface area materials may be applied to the fusion process in printing.

In yet another embodiment the pyro-processing step may be instead a hydrothermal process using soluble salts. If a hydrothermal process is used, the salts used may include lithium and/or nickel salts. A combination of processes may be used in this embodiment, which include drying and dehydration of the product from the hydrothermal process can be carried out in the flash calciner to reactivate the surfaces.

In yet a further embodiment electron conducting filaments are produced within the first intercalated material to increase the electron conduction in the particle with the following process steps. Solution doping the first intercalated material comprising a plurality of pores in which a soluble organic material 12 can be absorbed. In one embodiment the organic material is sucrose, but may be any other soluble organic material. Partly gasifying this dried material in steam 13 in the flash calciner to remove the volatile constituents to produce syngas 14 and an intercalated material 15 with thin filaments of electron conducting graphite on the internal pores.

This example embodiment demonstrates that a proven cathode material LiNi$_{0.5}$Mn$_{1.5}$O$_4$ can be produced using flash calcined materials such as Mn$_3$O$_4$, NiO, Li$_2$O. The present process may also improve performance of LiNi$_{0.5}$Mn$_{1.5}$O$_4$ by improving the electron conductivity in a battery by removing voids between the particles, for example. Improved electron conductivity may be achieved with the mixing process as discussed above.

The system and process may be applied to the development of new battery materials, including those required for magnesium and sodium ion batteries because the principles underpinning the use of the flash calciner have been established by improvements.

In another embodiment, the method for the production of precursors mixtures or solutions may be useful for producing organometallic precursors for sub-micron and nanoscale powders. The process may use a metal containing raw material (for example but not limiting to coarse oxide powders, metal powders, salts, slurries, waste product, organic compound or inorganic compound). The precursor may be a mixture. It is preferred that the mixture be homogeneous and that this precursor mixture be stable, i.e., homogeneity remains acceptable for a duration greater than the feed residence time in the process it is being used. A stability greater than 5 seconds is preferred, a stability greater than 5 minutes is more preferred, and a stability greater than 5 hours is most preferred.

The precursors with preferred embodiments discussed above may be processed into powders by, for example, reacting the precursor with oxygen or a gas comprising oxygen to form oxides, nitrogen, ammonia or a gas comprising nitrogen to form nitride, methane or a gas comprising carbon to form carbide, borane or a gas comprising boron to form boride, hydrogen or a gas comprising a reducing gas to form metal or suboxides. Other inorganic nanoparticles may similarly be formed by reacting the precursors with suitable gases.

The temperature of the solution is preferably controlled to optimize the precipitation characteristics. Lower temperatures reduce the reaction and diffusion rates.

In order to increase the axial velocity, everything else remaining same, one may decrease the diameter (or cross section) of the reactor. In order to reduce axial dispersion coefficient, one may vary numerous variables such as temperature or presence of substances that affect the dispersion coefficient.

In one embodiment, precursor is calcined in air at a temperature sufficient to convert the hydroxide into an oxide. In another embodiment, the calcination environment is changed to oxygen rich environment or to hydrogen rich environment or to carbon rich environment or to nitrogen rich environment to produce stoichiometric oxides, non-stoichiometric oxides (reduced oxide) or metals, carbides and nitrides respectively.

The calcination temperature is preferably determined as follows—the precipitate is processed in a thermogravimetric analyzer in line with a mass spectrometer (TGA-MS) where the weight loss as a function of temperature is monitored along with the composition of the species formed during the said weight loss. The preferred calcination temperature is the highest temperature above which (a) the rate of weight loss is always less than 5%, preferably 1% and most preferably 0.1%; and (b) the change of composition for any species is always less than 5%, preferably 1% and most preferably 0.1%. In case of multiple temperatures, the lowest temperature is preferred. The calcination temperature is preferably less than 0.5 times the melting point of the precipitate or the final product. While these guidelines are useful for many applications, the guidelines should be relaxed whenever the product formed at a lower temperature meets the needs of the desired user application. Finally, it should be noted that the guidelines may also be relaxed to reduce energy costs.

The calcination temperature may be reached using various temperature ramping methods. It is preferred to use an optimum ramp that reduces energy cost and processing time while maximizing the product quality. The heating environment may be changed during the ramp cycle to tailor the properties of the powders produced.

This invention can also be utilized to produce pure powders. Some non-limiting illustrations include electrochemical purification, sequential crystallization methods, extraction purification, distillation purification, chromatographic purification, membrane purification, and sublimation purification.

The calcination step yields the desired nanopowders. The calciner may be heated electrically or with natural gas or other available heat sources. In a preferred embodiment, the calcined powders are homogenized, sieved, and/or blended in-situ or post-calcination to ensure acceptability and uniform quality of the powders for a given application. If desired, a dispersion such as ink or paste may be made inside the calcination reactor by adding appropriate solvents and dispersants. The nanopowders can be removed from the calcination equipment using a number of methods. Some non-limiting examples include pneumatic conveying, screw conveying, venturi type eductor remover, or pumping. In case the nanopowders are removed using a gas conveying method, the powders can be removed near a packaging unit with a high efficiency membrane containing filter or cyclone.

The packaging of the nanoscale powders into suitable storage receptacles, bags or packets may be done using auger filler based packaging system or any powder packaging equipment. A coating, film, or component may also be prepared by dispersing the fine nanopowder and then applying various known methods such as but not limiting to electrophoretic deposition, magnetophorectic deposition, spin coating, dip coating, spraying, brushing, screen printing, ink-jet printing, toner printing, and sintering. The nanopowders may be thermally treated or reacted to enhance its electrical, optical, photonic, catalytic, thermal, magnetic, structural, electronic, emission, processing or forming properties before such a step.

Once the precursor is available, they may be used in any number of applications including the production of nanopowders. Other applications of the precursors include coatings, surface treatment, catalysis, reagent, precursors, tracers and markers, pharmaceuticals, biochemistry, electronics, optics, magnetic, electrochemistry etc.

A battery may be made from mixtures of anode materials particles, or mixtures cathode material particles, in a cell, in which all the particles are produced by the invention described herein to deliver a battery cell with desirable attributes, or to produce a battery from different cells in which each cell is composed of a different mixture of anode material particles, or of cathode material particles, so that the battery as a whole system has desirable attributes. A battery cell, or battery, may be produced by the use of either or both of the anode and cathode materials described herein. If required, the respective counterpart materials may be manufactured by an alternative process than described herein.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, with all changes which come within the meaning and range of equivalency therefore intended to be embraced therein. It will further be understood that any reference herein to known prior art does not, unless the contrary indication appears, constitute an admission that such prior art is commonly known by those skilled in the art to which the invention relates.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrial applicable.

The invention claimed is:

1. A process for producing materials for use in batteries, the process comprises the steps of;
   processing a precursor powder of a metal salt in an externally heated flash calciner in a gas medium at a first temperature to produce a porous particle material; wherein the first temperature is below 900° C. for a residence time of between about 10-30 seconds;
   flash calcining the processed precursor powder in a second calciner reactor segment with a second process gas to complete the calcination reaction to produce a calcined product wherein an exhaust temperature of the second calciner reactor segment is 350° C. to 400° C. for a residence time of up to 40 seconds or up to 650° C. for a residence time of about 3 seconds;
   flash quenching the calcined product in a quenching reactor segment to produce a metal oxide; and wherein the metal oxide is mixed with oxide powders with different particle sizes to provide a high packing density with an optimum particle-particle contact points, the mixed oxides are fused together to produce a film.

2. The process of claim 1, wherein the precursor powder can be processed to produce at least one of; a cathode material, an anode material, an ion conductor material, a separator material, a catalyst, and a mixture of an active catalyst and a catalyst support.

3. The process as claimed in claim 1, wherein the precursor powder is synthesised to have about 30-50% of the mass as volatile components, and is ground to a particle size in the preferred range of about 0.2 microns to 100 microns before injection into the flash calciner.

4. The process of claim 1, wherein at least one of $H_2O$, NOx, $CO_2$, CO, nitrous oxides, and sulphur oxides are removed from the precursor powder in the flash calciner.

5. The process of claim 1, wherein the sintering of the precursor powder is minimised by limiting temperature and residence time of the precursor powder in the flash calciner.

6. The process of claim 1, wherein the temperature and residence time are selected to give at least 95% efficiency in the removal of the volatile materials, and a residence time of less than 30 seconds, so that the metal oxide has at least one of the following properties; is mesoporous, a porosity in the range of 0.2 to 0.6, a surface area in the range of 15 $m^2/g$ to 250 $m^2/g$, a flexibility with a Young's Modulus less than 10% of that of a crystalline material of the same composition, and a high fracture strength.

7. The process of claim 1, wherein the gas medium is used to process multivalent ions in the precursor powder to a desired oxidated state and desired crystalline state, and in which the gas medium is selected from the group of; air, nitrogen, $CO_2$, steam, syngas, hydrogen, and a hydrocarbon.

8. The process of claim 1, wherein the precursor includes at least one catalytically active metal of the following group; chromium, nickel, cobalt, manganese, titanium, vanadium, palladium, and platinum.

9. The process of claim 1, wherein anode and cathode materials may be produced by an electron conductivity enhancement process in which the metal oxide is further processed by mixing the metal oxide into a solution of an organic compound, such that the metal oxide is doped, and the organic doped powder is recovered, dried and then processed in the flash calciner in an entrainment gas to deposit carbon threads in the pores of the organic doped powder.

10. The process of claim 1, wherein a laser is used to fuse oxide powder to form at least one layer of film.

11. The process of claim 10, wherein the laser is used as part of a 3D printing process wherein multiple layers of film are fabricated.

12. The process of claim 1, wherein the film is a flexible ceramic film.

\* \* \* \* \*